United States Patent Office 3,182,450
Patented May 11, 1965

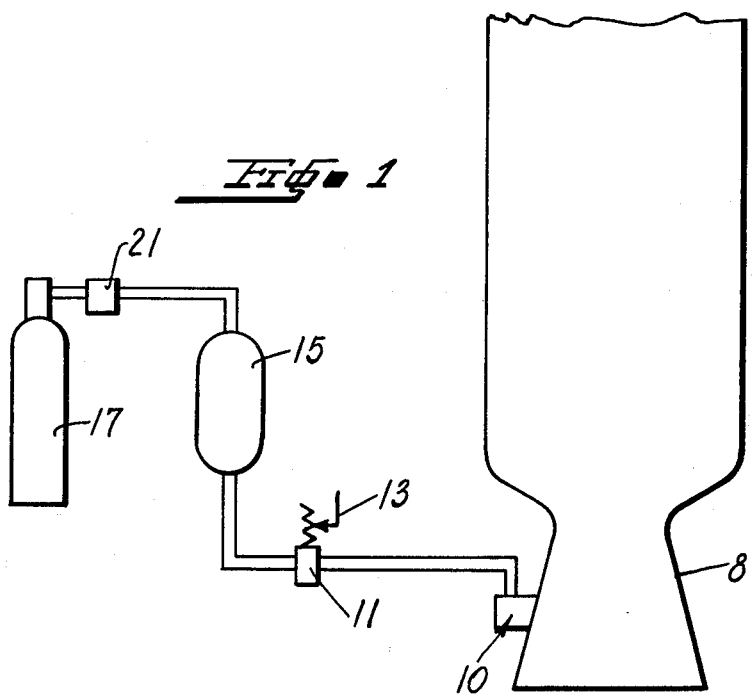
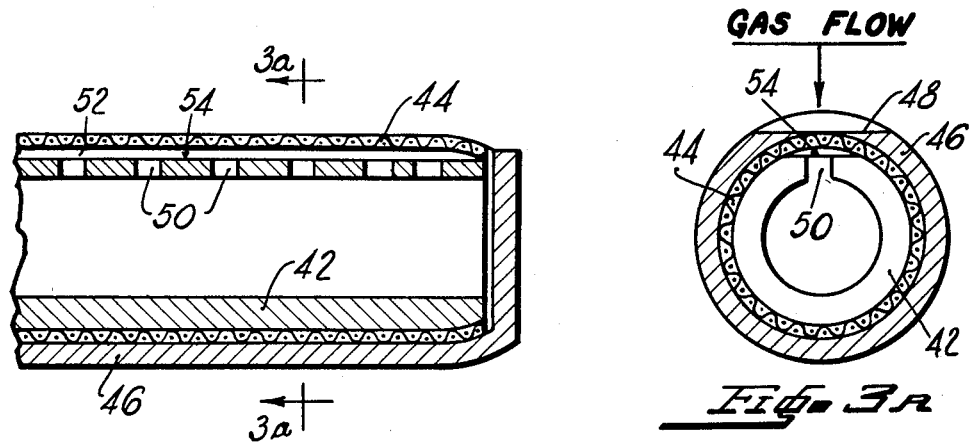

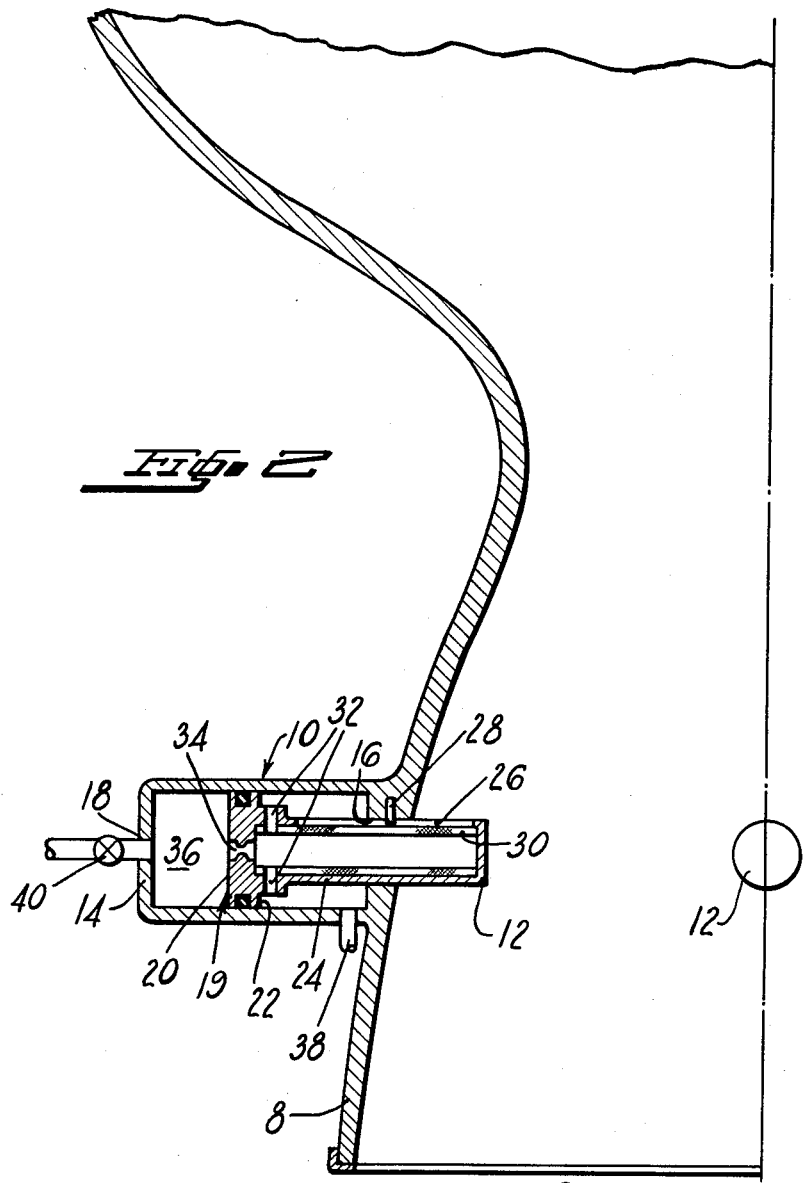

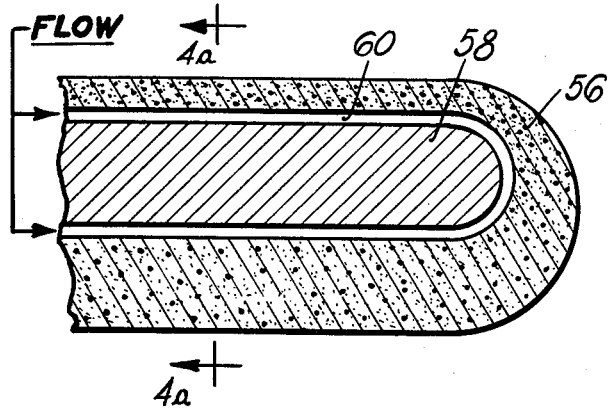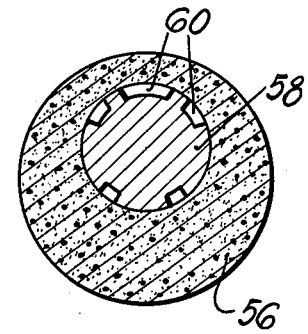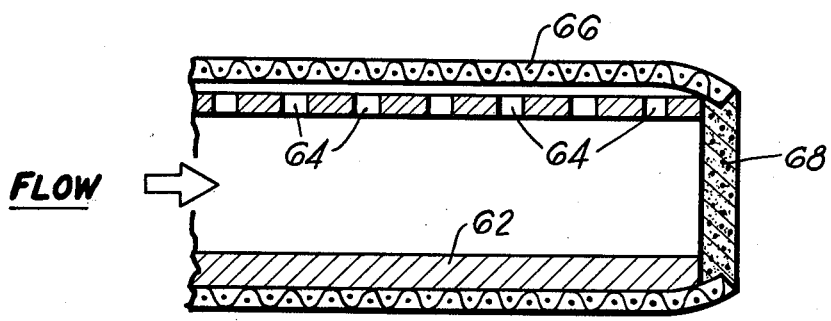

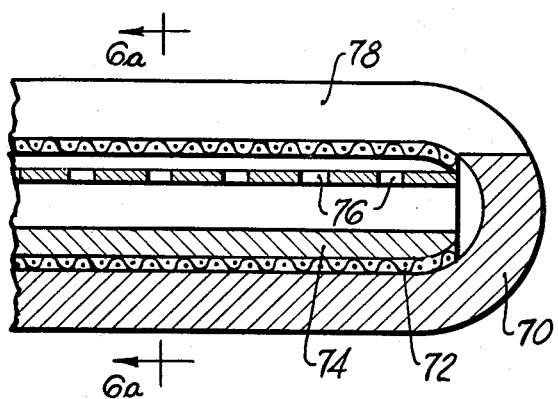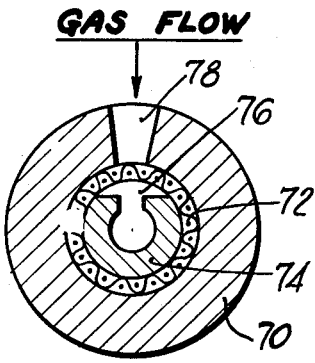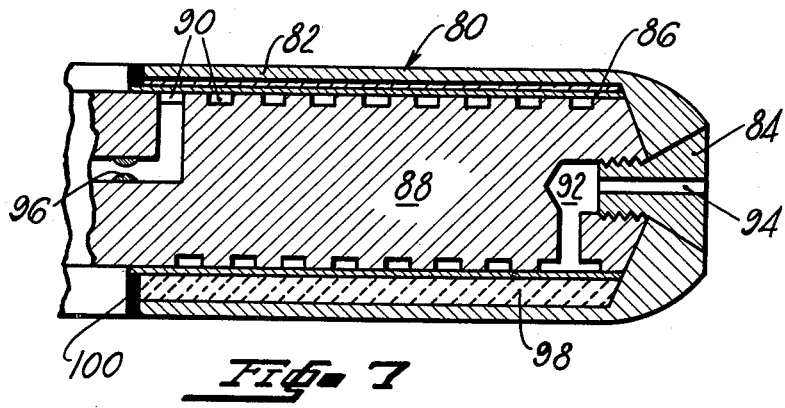

3,182,450
MEANS TO INSULATE THRUST VECTOR INTERCEPTOR SURFACE
George M. Widell and Carl D. Hawk, South Bend, Ind., assignors to The Bendix Corporation, South Bend, Ind., a corporation of Delaware
Filed Mar. 21, 1962, Ser. No. 181,349
9 Claims. (Cl. 60—35.54)

This invention relates to a means for utilizing a fluid to actuate a movable surface, lubricate the moving surface, insulate the moving surface and seal the actuating means. More particularly, this invention proposes to insulate and lubricate a thrust vectoring interceptor surface with an actuating fluid which is controlled to position the surface.

As the state of the art of controllable aircraft advances into an area where thrust vectoring blossoms as a desirable control feature, the industry has been faced with a need for a means to deviate a jet issuing from the nozzle of a jet motor with a view to producing powerful overall torques about the pitch, roll and yaw axes of an aircraft. For the purposes of this application, the term aircraft is intended to cover any heavier than air vehicle capable of flight within or without the earth's atmosphere. It is further deemed a necessity that any device for obtaining the control torques be designed to function with the minimum of power consumption, and the maximum of responsiveness, by the instantaneous alteration of the pressure distribution along the walls of the nozzle.

The present invention meets the above requirements, since it enables considerable deflections, of the order of magnitude of several angular degrees, to be effected in a high speed jet of gas while using movable parts of only small mass and only employing small forces compared to the result obtained.

It is thus the principal object of this invention to control the flow through a jet nozzle by an interceptor surface.

It is also an object to control the insertion of an interceptor surface in a jet nozzle flow.

Another object is to control the insertion of a surface with a means which also prevents ablation and provides lubrication for the interceptor surface.

A further object of this invention is to actuate an interceptor surface by a fluid such that said fluid is metered to flow about said surface as it is being extended and thereafter to lubricate and insulate said surface.

A still further object is to seal an interceptor surface when it is retracted to prevent erosion by exhaust gases.

Other and further objects will appear to those skilled in the art by the description and drawings for this invention.

In the drawings:

FIGURE 1 is a schematic presentation of a rocket engine incoporating a vectoring system in accordance with the present invention;

FIGURE 2 shows a side section of a rocket nozzle and thrust vectoring means according to the present invention;

FIGURES 3, 3A, 4, 4A, 5, 6, and 6A are detailed sections of an interceptor surface according to the present invention which show various internal modifications of said surface; and FIGURE 7 is a modified interceptor surface assembly showing internal rather than transpiration cooling for said surface.

In more detail and with reference to FIGURES 1 and 2, a rocket nozzle wall 8 is provided with a thrust vectoring assembly 10 whose interceptor surface 12 may be extended to produce a shock wave to induce an over-pressure zone downstream of the surface 12. This over-pressure zone is created by a well known shock wave theory that shows that momentum of a stream is slowed down by striking the shock wave and this results in a static pressure increase behind the shock wave. As presented by FIGURE 2, the interceptor surface 12 is mounted in several locations about the nozzle, two of which are shown illustrating an embodiment having the control unit at 90° stations around the nozzle.

It has been found that a bare interceptor surface, as depicted by Patent No. 2,694,898 has been rather ineffective due to the severe ablation of such a surface caused by high temperature gas flow, which in a matter of seconds completely melted the interceptor surface structure. Such a problem is eliminated by the assembly 10.

In the schematic arrangement presented by FIGURE 1, the assembly 10 is controlled by a solenoid valve 11 having a linear potentiometer 13 associated therewith which provides indication of the position of the interceptor surface.

The schematic arrangement of FIGURE 1 also shows a possible actuating fluid supply system using a water storage tank 15, a nitrogen supply tank 17 and a pressure regulator 21 for controlling the nitrogen being used as a means of expelling the water from tank 15 to the assembly 10.

Referring again to FIGURE 2, the assembly 10 includes a cylinder 14 formed integrally with the rocket nozzle wall 8. As seen in FIGURE 2, the cylinder 14 opens into the rocket nozzle wall 8 as at 16, and is provided with a port 18 opposite opening 16 in the cylinder end wall.

Inside the cylinder a reciprocating piston assembly 19 is mounted, said piston assembly having a large area face 20 and a small area face 22 located on a side of the piston opposite the large area 20. The piston assembly is also provided with a tubular extension 24 forming the interceptor surface 12. The tubular extension 24 is shown as a slotted tube with the slot 26 forming a guideway for a key 28 located in the rocket nozzle wall.

A metering filter 30 is placed inside the tubular extension 24 and openings 32 allow fluid to enter the filter 30 within the tubular portion 24. In addition, a restricted orifice 34 is provided in the reciprocating piston to permit the passage of fluid from that end of the cylinder to which the small area of the piston is exposed to the end of the cylinder to which the large area of the piston is exposed.

In operation a fluid is introduced to the cylinder 14 through a port 38. This fluid flows through openings 32 after filling the annular chamber confronting the piston face 22. The fluid then flows from within the tubular extension 24 through orifice 34 into chamber 36, and as the face 20 presents a larger area than face 22, the interceptor surface 12 is driven into the gaseous flow within the nozzle wall 8.

As the surface 12 is extended into the nozzle, the fluid in tubular portion 24 is metered by filter 30, and, as it is under pressure, it flows into the surrounding nozzle flow through the slot 26. It is to be understood that the slot 26 may have exit passages in the form of a plurality of pin holes or the tubular extension 24 may be of a porous construction. In any event, the fluid is introduced into the nozzle flow in a direction generally opposed to the nozzle flow, and this then creates a shock wave as well as a gaseous breakdown of the fluid. Furthermore, the fluid from slot 26 is redirected by said nozzle flow to flow about the interceptor surface 12 and form a vapor insulator therefor.

The position of the interceptor surface can be controlled by a flow regulating device 40, similar to the two-way solenoid 11, in connection with port 18 of the cylinder 14 to increase, maintain, or reduce the presure in chamber 36.

As shown, the slot 26 allows a fluid flow about the surface 12, which fluid acts as a lubricant between the nozzle wall and the interceptor surface. In addition, the coolant by being forceably expelled, as by the nitrogen tank 17, is at a higher pressure than the high temperature gas within the nozzle and thus prevents erosive leakage of hot gas into the assembly 10.

With regard to FIGURES 3, 3A, 4, 4A, 5, 6, and 6A, they present modified interceptor surfaces wherein the tubular extension 24 takes on different forms of construction. In more detail, FIGURES 3 and 3A show a tubular extension similar to that of FIGURE 2 and modified by placing a cylinder 42 within a metering filter 44, which filter 44 is within an outer cylindrical body 66 having a flattened portion 48 facing into jet stream flow. With this unit, the coolant flows within the cylinder 42 and through the longitudinal openings 50 into space 52 prescribed by the flattened edge 54 of cylinder 42 and the filter 44. The coolant then is metered by filter 44 to flow from the filter into the nozzle gas flow directly due to flat 48 being cut on a tangency with the surface of filter 44.

As for the tubular extension of FIGURES 4 and 4A, a porous metallic shell 56 is provided having a cylindrical body 58, also of metallic construction, eccentrically placed in said shell. The body 58 has a plurality of grooves 60 formed along the exterior surfaces, which grooves form a coolant passage behind the porous shell 56. As may be readily observed from FIGURES 4 and 4A the tubular extension has a porous shell having a varied thickness for travel of the coolant from grooves 60 to the exterior of shell 56. The thinner cross section affording minimum coolant travel is placed so as to face the gas stream in the nozzle. Thus, the most effective use of the coolant is obtained by varying the coolant rate according to local heat input. More particularly, the coolant is supplied in greater quantities to the area of the shell 56 having the minimum cross section, which area faces the gas stream. Additional protection is afforded to the interceptor surface of FIGURES 4 and 4A in that the side grooves of the body 58 extend about the ends of the plug to allow coolant flow to transpire the tip of shell 56 to complete the envelope of insulant for said probe when extended into the gas stream.

The interceptor surface of FIGURE 5 shows a tubular extension having an inner metallic cylinder 62 with a plurality of longitudinal openings 64, which cylinder is within a metering filter 66 and is joined at the tip of the interceptor surface by a porous metallic cap 68. Thus the coolant flows within cylinder 62, through openings 64 and out filter 66, as well as from within cylinder 62 through and out the porous cap 68. The openings 64 are facing the gas stream within the nozzle and thus the coolant is redirected to flow about the surface and away from the tip to insulate said surface from the gas stream.

FIGURES 6 and 6A show a further modification to a transpiration cooled and insulated interceptor surface according to the present invention where a thick outer housing 70 has a cylindrical filter 72 immediately therebehind which is further backed up by a flattened cylinder 74 having spaced openings 76 along the flattened portion. The housing 70 has a tapered slot 78 opening the filter 72 to the outside of housing 70, which slot 78 is in longitudinal alignment with openings 76 in cylinder 74. As may be expected the slot 78, as in the extension 24, opens into the gas flow.

The filter units mentioned in the above details may be formed as in Patent No. 2,857,657 relating to a construction process for wire mesh filters which may be designed to have metering characteristics.

It is also contemplated by this invention to provide an assembly, as seen in FIGURE 7, wherein a convection cooling arrangement affords adequate protection to the interceptor surface when inserted into a high temperature gas stream. In more detail, the probe of FIGURE 7 entails a cylindrical unit having a tip portion 80 which may be extended into the gas stream. The tip portion comprises a tubular housing 82 closed at the tip by a tapered plug 84. The tapered plug 84 also serves to hold the end of a rod and sleeve assembly including a sleeve 86 and a rod 88 having a spiral groove 90 formed therein to act as a coolant passage in said rod and sleeve assembly.

As is also seen in FIGURE 7, the spiral groove terminates in a chamber 92 which is in communication with a passage 94 in the tapered plug 84. A coolant is introduced to said groove 90 through a metering orifice 96 and allowed to exhaust through passage 94 into the surrounding gas stream. The coolant is supplied from the actuating fluid as is the case in all interceptor surfaces suggested.

Further features of the interceptor surface of FIG. 7 are the thermal barrier 98 placed between the housing 82 and the rod and sleeve assembly, which thermal barrier is of lesser cross section in the area facing the exhaust gas stream and of increasing cross section until a maximum cross section in the area diametrically opposite the area of lesser cross section. This means that the rod and sleeve assembly are eccentrically placed within housing 82 so that the maximum cooling occurs along the surface facing the gas stream.

With such an interceptor surface as shown in FIGURE 7, there is need for incorporating means affording expansion relief. This is shown as a ring 100 of ablative material allowing housing 82 to expand as it is heated. The ring 100 may be formed of a material which will withstand the high temperatures but which will shrink or compress to accommodate expansion of housing 82.

It is obvious that the foregoing description is merely for explanatory purposes and is in no way limitative of the present invention, but rather the scope of this invention is featured by the appended claims.

We claim:

1. For use with a nozzle subject to supersonic flow of a gaseous current therethrough, a device for deflecting a supersonic gaseous jet including a movable jet intercepting surface comprising:
   a cylinder attached to the nozzle wall having an opening into the nozzle;
   a means in said cylinder separating said cylinder into two variable volume chambers and provided with an extension connected thereto for traversing said opening in the nozzle wall;
   a restricted orifice in said means separating said cylinder into two variable volume chambers to allow fluid to flow from one side of said separating means to the other;
   a fluid supply opening connected to supply pressurized fluid to one of said variable volume chambers from which the fluid flows through said restricted orifice to the other of said variable volume chambers thereby pressurizing said separating means causing the same to move toward said fluid supply opening; and
   a means for directing a major portion of the fluid entering said fluid supply opening through said extension into the gaseous current to form a vapor insulant for said extension in the gas stream.

2. In a device for deflecting a supersonic gaseous jet including a nozzle subject to supersonic flow of a gaseous current therethrough, and a movable jet-intercepting assembly, said assembly comprising:
   a cylinder associated with said nozzle adjacent an opening in the wall of said nozzle;
   a reciprocating piston assembly separating said cylinder into two variable volume chambers;
   a tubular extension associated with said piston such that said piston moves said tubular extension through the opening in the wall of said nozzle from within said cylinder;
   a restricted orifice in said piston in communication with one of the variable volume chambers and the interior of said tubular extension;

a series of openings in said tubular extension spaced about the connection between said tubular extension and said piston assembly allowing a flow path between the variable volume chambers through the tubular extension;

a metering means in said tubular extension for metering flow through said tubular extension;

a fluid for actuating said reciprocating piston and for flowing through said tubular extension; and a flow regulating device for controlling said fluid in said variable volume chambers to control the extension and retraction of said tubular extension in said nozzle.

3. A device for deflecting a supersonic gaseous jet according to claim 2 wherein said tubular extension includes means to exhaust said actuating fluid into the nozzle flow to be redirected to flow about said tubular extension to insulate same.

4. A device for deflecting a supersonic gaseous jet according to claim 3 wherein said means for directing the actuating fluid into the supersonic jet includes a plurality of openings in said tubular extension.

5. A device for deflecting a supersonic gaseous jet according to claim 3 wherein said means for directing the actuating fluid into the nozzle flow comprises a porous outer shell for said tubular extension incorporating means to vary the rate of fluid expelled according to the rate of heat input to said porous shell.

6. A device for deflecting a supersonic gaseous jet according to claim 2 having a coolant passage in heat transfer relationship with the walls of said tubular extension.

7. A device for deflecting a supersonic gaseous jet according to claim 6 wherein said coolant passage is eccentrically located within said tubular extension to be in closer proximity of the surfaces facing the supersonic gaseous jet and farthest from those surfaces having less heat input.

8. In a thrust producing engine having a thrust nozzle through which a hot motive gas jet is expelled, a thrust vectoring means comprising:

a source of pressurized fluid;

a plurality of circumferentially spaced apart movable jet intercepting members mounted in the wall of the nozzle for movement toward the longitudinal axis of the nozzle;

a piston member operatively connected to each of said jet intercepting members for actuating the same toward said axis to deflect the gas jet accordingly;

first conduit means connected to deliver pressurized fluid from said source to one side of each of said piston members;

a restricted passage formed in each of said piston members for communicating a portion of said pressurized fluid from the one side of the piston member to the opposite side of the piston member;

second conduit means connected to vent the pressurized fluid from said opposite side of each of the piston members to a drain source;

passage means in each of said jet intercepting members for communicating the remaining portion of said pressurized fluid from said one side of the associated piston member through the jet intercepting member to the outer surface thereof exposed to the hot motive gas jet to cool said jet intercepting member; and valve means operatively connected to each of said second conduit means for controlling the pressurized fluid vented to said drain source to actuate the associated piston member accordingly.

9. For use with a nozzle subject to supersonic flow of a gaseous current therethrough, a device for deflecting a supersonic gaseous jet including a movable jet intercepting surface comprising:

a cylinder attached to the nozzle wall having an opening into the nozzle;

a means in said cylinder separating said cylinder into two variable volume chambers and provided with an extension connected thereto for traversing said opening in the nozzle wall;

a restricted passage connecting said two variable volume chambers;

a fluid supply opening connected to supply pressurized fluid to one of said two variable volume chambers from which the fluid flows through said restricted passage to the other of said two variable volume chambers thereby pressurizing said separating means causing the same to move toward said fluid supply opening; and a means for directing a major portion of the pressurized fluid entering said fluid supply opening through said extension into the gaseous current to form a vapor insulant for said extension in the gas stream.

References Cited by the Examiner
UNITED STATES PATENTS

| 2,354,151 | 7/44 | Skoglund | 60—35.6 |
| 2,584,127 | 2/52 | Harcum et al. | 102—50 X |
| 3,015,210 | 1/62 | Williamson et al. | 60—35.54 |
| 3,020,714 | 2/62 | Eggers et al. | 60—35.54 |
| 3,022,190 | 2/62 | Feldman | 60—35.6 |
| 3,036,430 | 5/62 | Eggers et al. | 60—35.54 |

SAMUEL LEVINE, *Primary Examiner.*

ABRAM BLUM, *Examiner.*